United States Patent

[11] 3,597,632

[72] Inventors James J. Vandemore
  Geneseo, Ill.;
  Donald E. Henry, Davenport, Iowa
[21] Appl. No. 812,487
[22] Filed Sept. 27, 1968
[45] Patented Aug. 3, 1971
[73] Assignee Gulf & Western Industries
  New York, N.Y.

[54] SOLID-STATE TIME-DELAY SWITCHING CIRCUIT
  7 Claims, 1 Drawing Fig.
[52] U.S. Cl. .............................................. 307/252,
  307/275, 307/293, 307/305
[51] Int. Cl. ...................................................... H03k 17/26
[50] Field of Search ............................................ 307/252,
  293, 275, 305

[56] References Cited
  UNITED STATES PATENTS
  3,053,995 9/1962 Hallberg ....................... 307/275
  3,471,716 10/1969 Dinger ......................... 307/275

Primary Examiner—Donald D. Forrer
Assistant Examiner—David M. Carter
Attorney—Meyer, Tilberry and Body This application filed under rule 47.

ABSTRACT: There is provided a time-delay switching circuit for switching an alternating-voltage supply source across a load comprising an electronic control means, such as a triac, having a first, second, and control electrode, and exhibiting the characteristic of presenting a low impedance to current flow from the voltage source to the load when a forward biasing signal is applied to the control electrode; and, circuit means for applying a forward biasing signal to the control electrode of the electronic control means. The circuit means includes a transformer having a primary and a secondary winding wherein the secondary winding is connected between the first and control electrode of the electronic control means; first and second actuatable switching means for, when both are actuated, completing a circuit between the primary winding and a power supply source for energizing the primary winding; means for periodically, and at a given frequency, actuating the first actuatable switching means; switch means having a first and a second condition; and, circuit means being responsive to the condition of the switch means for actuating the second actuatable switching means at a predetermined period of time after the switch means is switched from the first condition to the second condition.

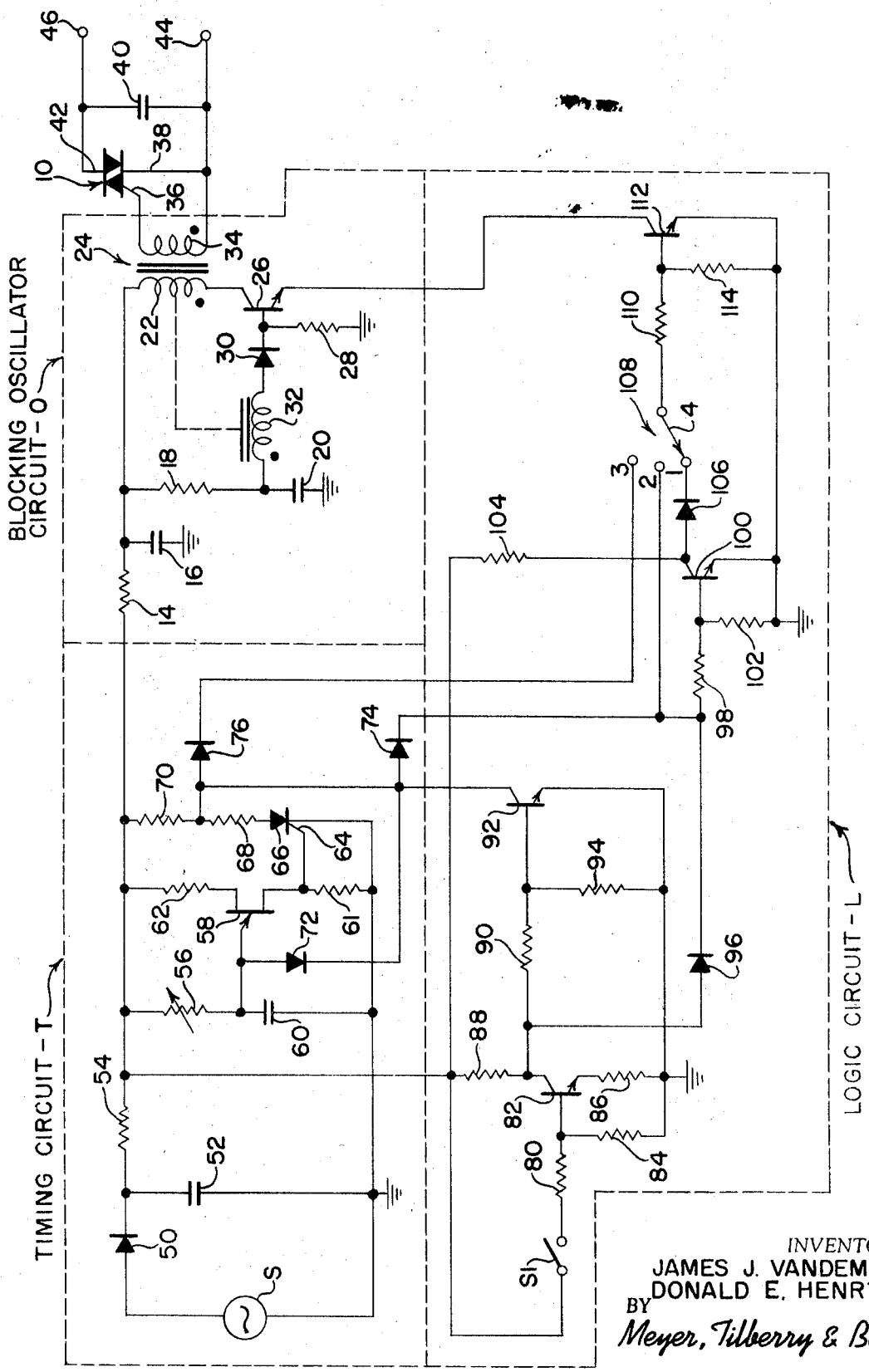

SOLID-STATE TIME-DELAY SWITCHING CIRCUIT

The present invention relates to the art of time-delay switching circuits, and, more particularly, to such circuits for gating an electronic device, such as a triac, into conduction at a predetermined period of time after an actuating signal is supplied.

The present invention is particularly applicable as a control circuit for a triac, and will be described with particular reference thereto, although it will be appreciated that the invention has broader applications and may be used with other similar switching devices.

Solid-state switching devices, which are triggered into conduction by a gating signal, for controlling the voltage applied to a load have become an important component in a wide variety of control applications. One such device is a silicon controlled rectifier. These devices are limited to use in permitting current conduction in one direction only; therefore, for alternating current applications it is necessary to employ two silicon controlled rectifiers, poled in reverse directions with the gates of each device separately triggered. More recently, a device known as a triac and described in Application Note 200.35, Mar., 1966 by General Electric Company, has been employed for controlling alternating current. The term triac is a generic term that has been given a three-electrode AC semiconductive switch.

Time-delay relays known heretofore for switching an alternating-voltage supply source across a load, particularly when high-current capability is required, have included an electronic circuit, such as a resistor-capacitor circuit, for energizing an electromechanical load relay after a predetermined period of time to thereby couple the load across the source. As is well known, electromechanical load relays inherently have certain limitations, to wit, relatively low speed operation, unreliable operation in adverse environment, relatively short life due to contact pitting, et cetera.

The present invention contemplates a new and improved time-delay circuit for controlling a switching device which overcomes all of the above referred-to problems, and others, and provides a circuit which is simple in construction.

In accordance with the present invention, there is provided a time-delay switching circuit for switching an alternating voltage source across a load comprising an electronic control means having a first, second, and control electrode, wherein the control means exhibits the characteristic of presenting a low impedance to current flow from the voltage source to the load when a forward-biasing signal is applied to the control electrode; and, circuit means for applying a forward-biasing signal to the control electrode. The circuit means includes a transformer having a primary and a secondary winding, wherein the secondary winding is connected between the first and control electrode; first and second actuatable switching means for, when both are actuated, completing a circuit between the primary winding and a power supply source for energizing the primary winding; means for periodically, and at a given frequency, actuating the first actuable switching means; switch means having a first and a second condition; and circuit means being responsive to the condition of the switch means for actuating the second actuatable switching means at a predetermined period of time after the switch means is switched from the first condition to the second condition.

In accordance with a more limited aspect of the present invention, the circuit means for actuating the second actuatable switching means includes a switch means for altering the condition that the electronic control means attains at a predetermined period of time after the switch means is switched from the first condition to the second condition.

The principle object of the present invention is to provide a solid-state circuit for switching an alternating-voltage supply source across a load at a predetermined period of time after actuation of a switch.

Another object of the present invention is to provide a solid-state circuit for switching an alternating-voltage source across a load at a predetermined period of time after receipt of an input signal.

Another object of the present invention is to provide a time-delay switching circuit in which the condition of the output terminals prior to timing, during timing, and upon completion of timing may be altered by varying the position of a switch.

A still further object of the present invention is to provide a semiconductor, time-delay switching circuit having a relatively high current capability.

A further object of the present invention is to provide a time-delay relay being capable of high-speed operation, reliable operation in adverse environments, and in which the life of the relay is independent of the number of switching operations.

Another object of the present invention is to provide a semiconductor time-delay switching circuit which is capable of operation at relatively high temperatures, i.e., in excess of 100°C.

A still further object of the present invention is to provide a time-delay circuit for actuating a switching device in which the gating signal takes the form of a short time-duration pulse to thereby increase the ambient temperature at which the device is capable of operation.

A further object of the present invention is to provide an improved time-delay circuit for gating a triac into conduction.

These and other objects and advantages of the invention will become apparent from the following description of the preferred embodiment of the invention as read in conjunction with the accompanying drawing in which:

The FIG. is a schematic circuit diagram illustrating an electronic control circuit for gating a triac into conduction after a predetermined period of time in accordance with the preferred embodiment of the present invention.

Reference is now made to the drawing, wherein the showings are for purposes of illustrating a preferred embodiment of the present invention and not for purposes of limiting same, the FIG. illustrates a time-delay control circuit for gating a triac, and generally comprises a timing circuit T connected through a logic circuit L and blocking oscillator circuit O to the control electrode of a triac 10.

BLOCKING OSCILLATOR

Blocking oscillator circuit O, as is more particularly described in U.S. Pat. application, Ser. No. 730,212, filed Apr. 16, 1968, and entitled "High Temperature Semiconductor Switching circuit,", includes a resistor 14 having one terminal connected to timing circuit T and the other terminal connected through a capacitor 16 to ground. Connected to the junction between resistor 14 and capacitor 16 is one terminal of a resistor 18 having the other terminal thereof connected through a capacitor 20 to ground. Also connected to the junction between resistor 14 and capacitor 16 is one terminal of a primary winding 22 of a transformer 24. Connected to the other terminal, or the positive-polarity indicated end, of primary winding 22 is the collector of an NPN transistor 26 having its base connected through a resistor 28 to ground. Also connected to the base of transistor 26 is the cathode of a diode 30 having its anode connected to one terminal of a feedback winding 32 of transformer 24. The other terminal, or the positive-polarity indicated end, of feedback winding 32 is connected directly to the junction between resistor 18 and capacitor 20. The emitter of transistor 26 is connected to one terminal of logic circuit L. One terminal of a secondary winding 34 of transformer 24 is connected to the control electrode 36, or gate terminal, of triac 10, and the other terminal, or positive-polarity indicated end, of secondary winding 34 is connected directly to a first terminal 38 of triac 10. A capacitor 40 is connected between the first terminal 38 and a second terminal 42 of triac 10. Also, the first terminal 38 and second terminal 42 of triac 10 provide the output terminals 44 and 46, respectively.

TIMING CIRCUIT

Timing circuit T includes an alternating-voltage supply source S having one terminal connected directly to ground, and the other terminal connected to the anode of a diode 50. The cathode of diode 50 is connected through a capacitor 52 to ground, and through a resistor 54 to one terminal of a potentiometer 56. The other terminal of potentiometer 56 is connected directly to the base of a unijunction transistor 58, and is also connected through a capacitor 60 to ground. The first base of unijunction transistor 58 is connected through a resistor 61 to ground, and the second base of this transistor is connected through a resistor 62 to the junction between resistor 54 and potentiometer 56. Also connected to the first base of unijunction transistor 58 is a control electrode 64 of a silicon controlled rectifier 66. The cathode of silicon controlled rectifier 66 is connected directly to ground, and the anode of this device is connected through a pair of series connected resistors 68 and 70 to the junction between resistor 54 and potentiometer 56.

Connected to the base of unijunction transistor 58 is the anode of a diode 72 having its cathode connected to the anode of a diode 74. The anode of diode 74 is also connected to the junction between resistors 68 and 70, and to the anode of a diode 76.

LOGIC CIRCUIT

Logic circuit L includes a normally open switch S1 having one terminal connected to the junction between resistor 54 and potentiometer 56, and the other terminal connected through a resistor 80 to the base of an NPN transistor 82. As may be readily apparent, normally open switch S1 may be deleted from the circuit and an external direct-current supply source could be coupled through resistor 80 to transistor 82, if it is desirable to actuate the circuit externally.

The base and emitter of transistor 82 are connected through resistors 84 and 86, respectively, to ground. The collectors of transistor 82 is connected through a resistor 88 to the junction between resistor 54 and potentiometer 56. Also connected to the collector of transistor 82 is a resistor 90, having the other terminal thereof connected directly to the base of an NPN transistor 92. The base of transistor 92 is also connected through a resistor 94 to ground, and the emitter of transistor 92 is connected directly to ground. The collector of transistor 92 is connected to the anode of diode 74.

Also connected to the collector of transistor 82 is the anode of a diode 96 having its cathode connected through a resistor 98 to the base of an NPN transistor 100. The base of transistor 100 is also connected through a resistor 102 to ground, and the emitter of this transistor is connected directly to ground.

The collector of transistor 100 is connected through a resistor 104 to the junction between resistor 54 and potentiometer 56. Also connected to the collector of transistor 100 is the anode of a diode 106 having its cathode connected to terminal 1 of a rotary-type switch 108. Terminal 2 of rotary switch 108 is connected to the junction between diode 96 and resistor 98, and to the cathode of diode 74. Terminal 3 of switch 108 is connected directly to the cathode of diode 76.

The movable arm 4 of switch 108 is connected through a resistor 110 to the base of an NPN transistor 112, and the base of this transistor is also connected through a resistor 114 to ground. The emitter of transistor 112 is connected directly to ground, and the collector of this transistor is connected to the emitter of transistor 26.

OPERATION OF BLOCKING OSCILLATOR CIRCUIT

The signal supplied by alternating-voltage supply source S is rectified through the network comprised of diode 50, capacitor 52, resistors 54 and 14, and capacitor 16, to thereby provide a direct-current signal which will charge capacitor 20 through resistor 18, and will also cause transformer 24 to begin to store energy in primary winding 22. As energy is gradually stored in primary winding 22, a positive voltage of increasing amplitude is induced in feedback winding 32 of the polarity indicated with reference to the polarity dot. The voltage induced in feedback winding 32 is applied through diode 30 to gradually forward bias transistor 26 into conduction. Once transistor 26 commences to conduct, capacitor 20 rapidly discharges through primary winding 22 and transistors 26 and 112 to ground, assuming transistor 112 is forward biased into conduction.

When capacitor 20 discharges through primary winding 22, a voltage impulse of short duration is developed across primary winding 22 which in turn induces a similar pulse in secondary winding 34, to thereby apply a short duration gating signal to control electrode 36 of triac 10. This gating signal causes triac 10 to switch from an "off" to an "on" condition. In the "on" condition, a closed path is completed between terminals 44 and 46, which path will be maintained until an alternating-voltage signal supplying a load passes through approximately a zero-voltage level. Because the gating pulse is of a very short duration, excessive current is not applied to the control electrode 36 of triac 10, and operation at high temperatures is made possible.

Also, upon saturation of the core of transformer 24, the induced current through feedback winding 32 terminates, and the forward biasing signal applied to transistor 26 terminates, to thereby cause this transistor to again become reverse biased. Once transistor 26 becomes reverse biased, capacitor 20 will again begin to charge to thereby commence another cycle of operation.

When transistor 112 is reverse biased, the oscillator circuit including transistor 26 will crease to oscillate since there will be no path for the discharge of capacitor 20. Transistor 112 is actuated by the signal supplied from timing circuit T and logic circuit L.

OPERATION OF TIMING AND LOGIC CIRCUITS

Prior to the closure of normally open switch S1, transistor 82 is reverse biased to thereby cause transistors 92 and 100 to become forward biased. When transistor 92 is forward biased, capacitor 60 will discharge and remain in a discharge condition through diode 72 and transistor 92. Since transistor 82 is reverse biased, and transistor 100 is forward biased, a binary "1" signal will appear at terminal 2, and a binary "0" signal will appear at terminal 1, respectively, of switch 108. By a binary "0" signal is meant a signal equal to approximately ground potential, and by a binary "1" signal is meant a signal of some positive potential. Since the anode of diode 76 is effectively grounded through transistor 92, the signal appearing at the cathode of diode 76, i.e., terminal 3 of switch 108 will be a binary "0" signal.

Upon closure of normally open switch S1, the direct-current signal developed by diode 50 and capacitor 52 is applied to the base of transistor 82 to forward bias this transistor into conduction, thereby commencing a timing cycle. When transistor 82 becomes forward biased, transistor 92 will become reverse biased to thereby allow capacitor 60 to commence charging through potentiometer 56. As is readily apparent the impedance of potentiometer 56 may be varied to alter the timing cycle of operation. During the timing operation, transistor 100 will remain in a conductive state since a binary "1" signal is applied to the base thereof through resistor 70, diode 74, and resistor 98. Since transistor 100 remains in a conductive condition, the signal appearing at terminal 1 of switch 108 will remain at a binary "0" signal level. When transistor 92 becomes reverse biased, a binary "1" signal will appear at the anode of diode 74 to thereby apply a binary "1" signal to terminal 2 of switch 108. Similarly, a binary "1" signal will appear at the anode of diode 76 to thereby cause the signal at terminal 3 of switch 108 to change from a binary "0" signal to a binary "1" signal.

When the voltage developed across capacitor 60 attains a level sufficient to cause unijunction transistor 58 to fire or "avalanche,", a voltage will be developed across resistor 61 to thereby gate silicon controlled rectifier 66 into conduction. When silicon controlled rectifier 66 becomes conductive, a binary "0" signal will be applied to the anode of diodes 74 and 76. Since transistor 82 remains in a conductive state after the 5 of a timing cycle, a binary "0" signal will be applied to the anode of diode 96. With a binary "0" signal applied to the anodes of diodes 74, 76 and 96, a binary "0" signal will appear at terminals 2 and 3 of switch 108.

In accordance with the preferred embodiment of the invention, the binary signals appearing at terminals 1, 2, and 3 of switch 108 and the conditions of output terminals 44 and 46 during each of the timing phases are illustrated in Table I:

TABLE I

| Timing cycle | Binary signal at terminal— | | | Condition of output (arm 4 at terminal—) | | |
| --- | --- | --- | --- | --- | --- | --- |
| | 1 | 2 | 3 | 1 | 2 | 3 |
| Prior to timing | "0" | "1" | "0" | Open | Closed | Open |
| Timing | "0" | "1" | "1" | do | do | Closed |
| Time-out | "1" | "0" | "0" | Closed | Open | Open |

When a binary "0" signal appears at terminal 1 of switch 108, assuming movable arm 4 is in the position as illustrated in the FIGURE, a binary "0" signal will be applied to the base of transistor 112 thereby reverse biasing this transistor. If a binary "1" signal appears at terminal 1 of switch 108, transistor 112 will be forward biased into conduction, thereby commencing operation of blocking oscillator circuit 0.

As is readily apparent, with movable arm 4 of switch 108 in the position as illustrated in the FIGURE, a circuit is completed between terminals 44 and 46 through triac 10 at a predetermined time after closure of switch S1. If, however, movable arm 4 of switch 108 is moved to terminal 2, upon closure of switch S1 a circuit will be completed between terminals 44 and 46 until the completion of a timing cycle. If movable arm of switch 108 is positioned at terminal 3, triac 10 will be conductive only during the period of timing.

Although the invention has been shown in connection with a preferred embodiment, it will be readily apparent to those skilled in the art that various changes in form, such as replacement of switch S1 with an external signal source, in order to provide external control of the circuit, may be made without departing from the spirit and scope of the invention as defined by the appended claims.

We claim:
1. A time-delay switching circuit for switching an alternating voltage source across a load comprising:
   static switch means having a first, second, and control electrode, said switch means exhibiting the characteristic of presenting a low impedance to current flow from said alternating voltage source to said load when a forward biasing signal is applied to said control electrode;
   circuit means for applying a forward biasing signal to said control electrode including:
   First circuit means for developing a signal from a said alternating-voltage source;
   generating and actuatable switching means coupled to said first circuit means, for, when both are actuated, applying a said forward biasing signal to said control electrode of said static switch means;
   means for actuating said generating means;
   second circuit means having a first and second condition respectively providing a first level signal and a second level signal;
   a normally open switch for energizing said second circuit means from said first circuit means for transferring it from first signal level to second signal level; and
   third circuit means for actuating said actuatable switch means at a predetermined period of time after said signal attains a said second level.

2. A switching circuit as defined in claim 1 wherein said static switch means is a triac having first and second electrodes adapted to be connected in series with an alternating voltage source and a load;
   and, said third circuit means includes electronic control means having a first, second, and control electrode, said second electrode of said electronic control means being coupled to said actuatable switching means, and said control electrode of said electronic control means being coupled to said second circuit means.

3. A switching circuit as defined in claim 2 wherein said means for actuating said generating means is a means for periodically, and at a given frequency, actuating said generating means, and includes a transformer having a primary and a secondary winding, said secondary winding connected between said first and said control electrodes of said static switch means; and, said generating and said actuatable switching means coupled between said first circuit means and said primary winding of said transformer, for, when both are actuated, completing a circuit between said primary winding and said first circuit means.

4. A switching circuit as defined in claim 3 wherein said transformer includes a feedback winding coupled between said first circuit means and said generating means;
   said actuatable switching means has a first and a second condition; and, said third circuit means includes a switch means for altering the condition of said actuatable switching means prior to and after actuation.

5. In a triac switching circuit for switching an alternating voltage source across a load after a predetermined period of time comprising:
   circuit means for applying a forward biasing signal to a said triac including:
   first circuit means for developing a signal from a said alternating-voltage source;
   generating and actuatable switching means coupled to said first circuit means, for, when both are actuated, applying a said forward biasing signal to a said triac;
   means for actuating said generating means;
   second circuit means for developing a signal having a first level and a second level; and,
   third circuit means coupling said signal developing means to said actuatable switching means for actuating said actuatable switch means at a predetermined period of time after said signal attains a said second level.

6. A circuit as defined in claim 5 wherein said means for periodically actuating said generating means includes a transformer having a primary and a secondary winding, said secondary winding adapted to be connected between a first and said control electrode of a said triac; said generating and said actuatable switching means coupled between said first circuit means and said primary winding of said transformer, for, when both are actuated, completing a circuit between said primary winding and said first circuit means;
   and, said third circuit means includes electronic control means having a first, second, and control electrode, said second electrode of said electronic control means being coupled to said actuatable switching means, and said control electrode of said electronic control means being coupled to said second circuit means.

7. A circuit as defined in claim 6 wherein said transformer includes a feedback winding coupled between said first circuit means and said generating means;
   and said actuatable switching means has a first and a second condition; and, said third circuit means includes a switching means for altering the condition of said actuatable switching means prior to and after actuation.